Nov. 23, 1926.

M. I. MAGOON

COVER FOR COOKING VESSELS

Filed May 18, 1925    2 Sheets-Sheet 1

1,608,223

Witnesses:

Inventor:
Marius I. Magoon,
By Joshua R H Potts.
his Attorney.

Nov. 23, 1926.
M. I. MAGOON
COVER FOR COOKING VESSELS
Filed May 18, 1925 2 Sheets-Sheet 2
1,608,223
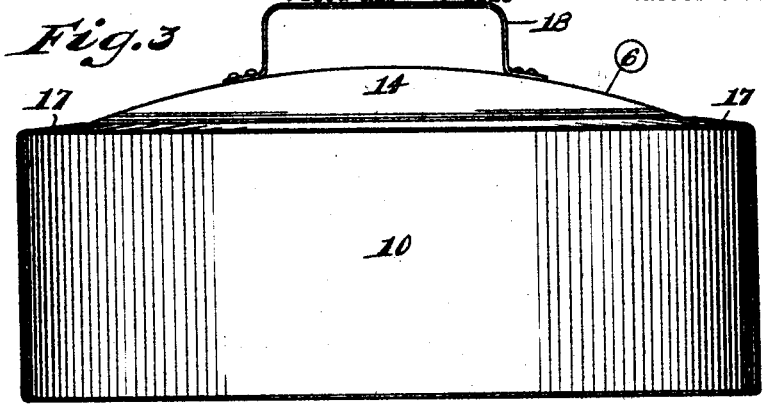
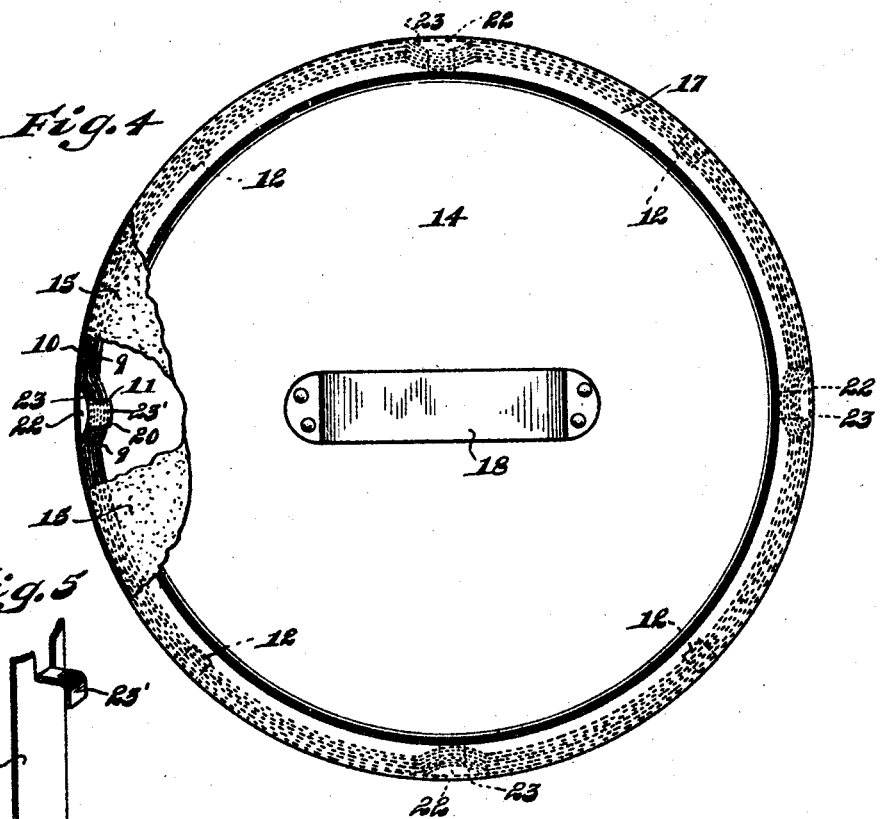
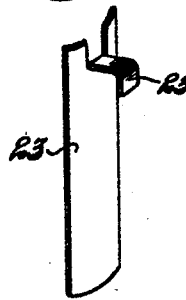
Witnesses:
Inventor:
Marius I. Magoon,
By Joshua R. H. Potts.
his Attorney.

Patented Nov. 23, 1926.

1,608,223

UNITED STATES PATENT OFFICE.

MARIUS I. MAGOON, OF HAMMOND, INDIANA.

COVER FOR COOKING VESSELS.

Application filed May 18, 1925. Serial No. 30,960.

My invention relates to covers for cooking vessels, adapted especially to reduce heat waste during cooking operations and to confine and distribute the rising heat about the cooking vessels, and my invention has for its main object the provision of an improved construction of this kind which will be highly efficient in use and economical in manufacture.

Other objects will appear hereinafter.

The invention consists in the combinations and arrangements of parts hereinafter described and claimed.

The invention will be best understood by reference to the accompanying drawings forming a part of this specification, and in which, Fig. 1 represents a central cross section through a cover made in accordance with the present invention;

Fig. 3 shows a side elevational view of the cover;

Fig. 4 is a top plan view thereof with parts broken away; and

Fig. 5 is a perspective view of a channel piece.

Figure 1:
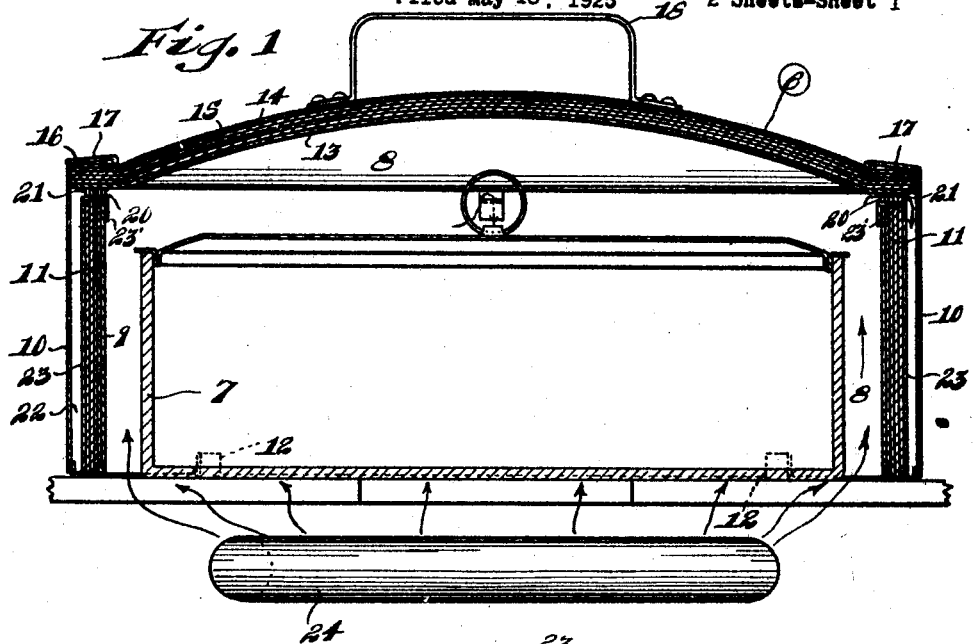
Figure 2:
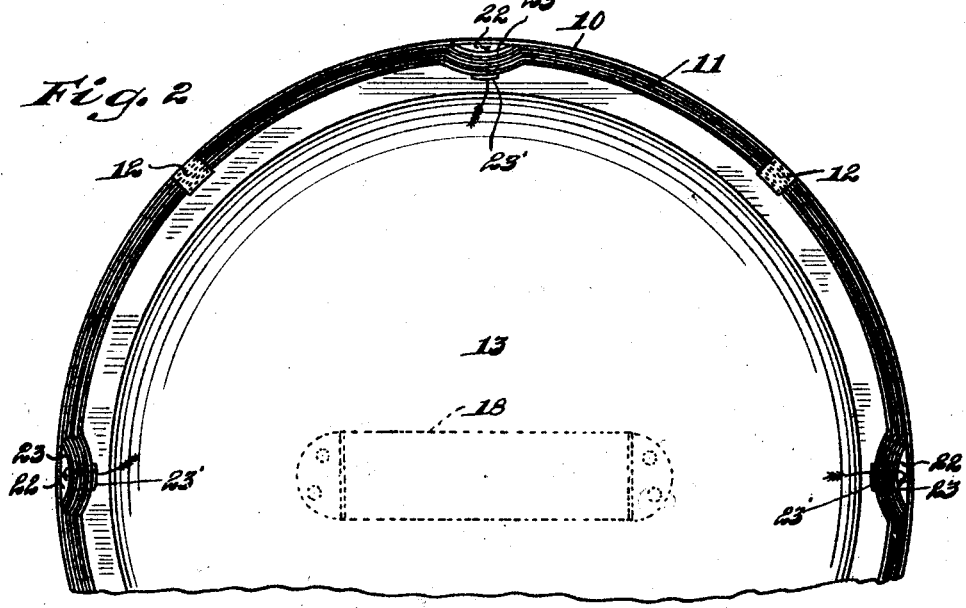
Fig. 2 shows an underneath plan view of the cover, fractionally shown.

The preferred embodiment of my invention as illustrated in the accompanying drawings comprises a hood designated generally by the reference character 6 and made of a size sufficient to be placed over a cooking vessel as 7 so as to provide therearound an air space 8.

In the contruction shown, the hood 6 includes side walls or shells 9 and 10 which are connected together in spaced relation and between which is placed a suitable packing or filling comprising uninflammable heat insulating material. Preferably and as shown the packing or filling consists of layers of asbestos 11 which may be conveniently inserted in ring form. The outer wall or shell 10 may be formed at its lower end, as shown, with spaced clip members 12 adapted to be engaged over and crimped upon the inner wall member 9.

The hood 6 further includes spaced top members 13 and 14 between which is placed suitable heat conserving material 15. The composite marginal edge 16 of the top closure, composed of the inner and outer members 13 and 14 and insulating material 15 is mounted upon the inner side wall 9 and insulating material 11 surrounding the same. The outer side wall 10 is formed with a flanged portion 17 which is bent over, crimped or otherwise secured upon the top member 14 of the top closure. To the top closure is secured a handle member 18 whereby the hood may be lifted or carried about.

Through the inner wall 9 are provided spaced apertures 20 at the top end thereof, and through the insulating material 11 are provided suitable registering apertures 21 which comprise suitable inlets for draft passageways 22 produced by inserting facewise alongside the outer wall 10 the channel pieces 23 which extend to and discharge at the bottom end of the hood as shown. Said channel pieces are provided at their top ends with struck-out lugs 23' adapted to be projected through the inlet apertures 21 and 20 and to be bent down upon the inner wall 9. Provision is thus made for inducing drafts from the upper interior of the hood to points around the bottom edge thereof. From a heating element 24, herein represented as a gas burner, the heat rises into the air space 8 between the hood and the cooking vessel 7, and because of the draft passageways opening from the interior of the hood, the hot air rising from the burner is drawn into the air space 8. Preferably, the draft passageways are made relatively small in cross section so that while they are sufficient to induce the desired draft, they will not, on the other hand, seriously affect the distribution and confinement around the cooking vessel. The hood made with draft passageways arranged in accordance with the present invention, is especially effective in connection with a heating element such as a gas burner, since the cool air currents which move toward the burner to take the place of the heated air rising therefrom, tend to induce a strong down draft through the passageways as well as to direct the rising hot air into the air space surrounding the cooking vessel. This arrangement makes it possible to cook with a great saving of gas.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the claims.

Having described my invention, what I claim as new and desire to secure by Letters Patent is:

1. A cover construction for cooking vessels comprising a shell; a lining arranged on the inner face of said shell and composed of a plurality of heat insulating sheets; channel pieces imprisoned between the outermost sheet and the shell and forming draft passageways; and air inlet passages leading through said sheets to said draft passageways, substantially as described.

2. A cover construction for cooking vessels comprising a shell including separate side and top walls; a lining arranged on the inner face of each of said walls and composed of a plurality of heat insulating sheets; the top wall with its lining sheets resting upon the lining for the side wall; and means securing said top wall with its lining in place, substantially as described.

3. A cover construction for cooking vessels comprising a shell including separate side and top walls; a lining arranged on the inner face of each of said walls and composed of a series of heat insulating sheets; the top wall with its lining sheets resting upon the lining sheets for the side wall; flange means securing said top wall with its lining sheets in place; and clip means binding the side wall and its lining sheets together, substantially as described.

4. A cover construction for cooking vessels comprising a shell including separate side and top walls; a lining arranged on the face of each of said walls and composed of a series of heat insulating sheets; the top wall with its lining sheets resting upon the lining sheets for the side wall; means securing said top wall with its lining sheets in place; channel pieces imprisoned between the side wall and its outermost lining sheet and forming draft passages and inlet passages through the top ends of the side wall lining sheets to said draft passages, substantially as described.

5. A cover construction for cooking vessels comprising inner and outer shells; a lining arranged between said inner and outer shells and composed of a series of heat insulating sheets; means securing the inner shells, outer shells and interposed lining sheets together; channel pieces imprisoned between the outer shell and its outermost lining sheet and forming draft passageways; inlet passages extending through the inner shell and lining sheets to said draft passageways; and clips formed on said channel pieces and engaging over the lining sheets and inner shell, substantially as described.

In testimony whereof I have signed my name to this specification.

MARIUS I. MAGOON.